US010895995B2

(12) United States Patent
Guerra Delgado et al.

(10) Patent No.: US 10,895,995 B2
(45) Date of Patent: *Jan. 19, 2021

(54) CAPACITY BASED LOAD BALANCING IN DISTRIBUTED STORAGE SYSTEMS WITH DEDUPLICATION AND COMPRESSION FUNCTIONALITIES

(71) Applicant: VMware, Inc., Palo Alto, CA (US)

(72) Inventors: Jorge Guerra Delgado, Sunnyvale, CA (US); Jin Zhang, Palo Alto, CA (US); Radhika Vullikanti, Palo Alto, CA (US); Abhishek Gupta, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 56 days.

This patent is subject to a terminal disclaimer.

(21) Appl. No.: 16/431,648

(22) Filed: Jun. 4, 2019

(65) Prior Publication Data
US 2019/0286360 A1 Sep. 19, 2019

Related U.S. Application Data

(63) Continuation of application No. 15/592,834, filed on May 11, 2017, now Pat. No. 10,359,966.

(51) Int. Cl.
| | |
|---|---|
| *G06F 3/06* | (2006.01) |
| *G06F 16/23* | (2019.01) |
| *G06F 16/174* | (2019.01) |
| *G06F 9/455* | (2018.01) |
| *G06F 16/25* | (2019.01) |
| *H04L 29/08* | (2006.01) |

(52) U.S. Cl.
CPC ............ *G06F 3/0647* (2013.01); *G06F 3/067* (2013.01); *G06F 3/0608* (2013.01); *G06F 3/0641* (2013.01); *G06F 16/2365* (2019.01); *G06F 3/0617* (2013.01); *G06F 9/45558* (2013.01); *G06F 16/174* (2019.01); *G06F 16/1744* (2019.01); *G06F 16/25* (2019.01); *G06F 2009/45579* (2013.01); *H04L 67/1097* (2013.01)

(58) Field of Classification Search
CPC .... G06F 3/0608; G06F 3/0617; G06F 3/0641; G06F 3/0646–0647; G06F 3/067; G06F 16/1748
See application file for complete search history.

(56) References Cited

U.S. PATENT DOCUMENTS

| | | | |
|---|---|---|---|
| 6,442,601 | B1 | 8/2002 | Gampper et al. |
| 7,921,086 | B1 | 4/2011 | Bromley et al. |
| 9,559,961 | B1 | 1/2017 | Sorenson et al. |
| 2007/0096954 | A1 | 5/2007 | Boldt et al. |
| 2007/0168336 | A1 | 7/2007 | Ransil et al. |

(Continued)

*Primary Examiner* — Reginald G Bragdon
*Assistant Examiner* — Curtis James Kortman
(74) *Attorney, Agent, or Firm* — Patterson + Sheridan, LLP

(57) ABSTRACT

A logical group of data blocks stored in a first node is migrated to a second node according to a method that includes determining a first metric for each logical group of data blocks stored in the first node, the first metric representing a total size of the data blocks in the logical group, determining a second metric for each logical group of data blocks stored in the first node, the second metric representing a total size of the data blocks in the logical group that are uniquely stored in the first node, and selecting a logical group of data blocks for migration from the first node to the second node based on the first metric and the second metric.

20 Claims, 6 Drawing Sheets

(56) References Cited

U.S. PATENT DOCUMENTS

| | | |
|---|---|---|
| 2010/0077013 A1 | 3/2010 | Clements et al. |
| 2012/0166403 A1 | 6/2012 | Kim et al. |
| 2014/0114933 A1 | 4/2014 | Chandrasekarasastry et al. |
| 2015/0058384 A1 | 2/2015 | Karamanolis et al. |
| 2015/0169229 A1 | 6/2015 | Tsucihya |
| 2016/0085574 A1 | 3/2016 | Dornemann et al. |
| 2016/0188181 A1 | 6/2016 | Smith |
| 2017/0060472 A1 | 3/2017 | Zhuang et al. |

CAPACITY BASED LOAD BALANCING IN DISTRIBUTED STORAGE SYSTEMS WITH DEDUPLICATION AND COMPRESSION FUNCTIONALITIES

CROSS-REFERENCE TO RELATED APPLICATIONS

This application claims priority to U.S. patent application Ser. No. 15/592,834, filed May 11, 2017, which is hereby incorporated by reference herein in its entirety.

BACKGROUND

Distributed systems allow multiple clients in a network to access a pool of shared resources. For example, a distributed storage system allows a cluster of host computers to aggregate local storage devices (e.g., SSD, PCI-based flash storage, SATA, or SAS magnetic disks) located in or attached to each host computer to create a single and shared pool of storage. This pool of storage (sometimes referred to herein as a "datastore" or "store") is accessible by all host computers in the cluster and may be presented as a single namespace of storage entities (such as a hierarchical file system namespace in the case of files, a flat namespace of unique identifiers in the case of objects, etc.). Storage clients in turn, such as virtual machines spawned on the host computers may use the datastore, for example, to store virtual disks that are accessed by the virtual machines during their operation. Because the shared local storage devices that make up the datastore may have different performance characteristics (e.g., capacity, input/output per second or IOPS capabilities, etc.), usage of such shared local storage devices to store virtual disks or portions thereof may be distributed among the virtual machines based on the needs of each given virtual machine. Accordingly, in some cases, a virtual disk may be partitioned into different data chunks or stripes that may be distributed among local storage resources of hosts in the datastore, where each data stripe may then be stored by local storage resources of different hosts in the datastore.

In some cases, to increase storage efficiency of distributed storage systems, a technology referred to as data deduplication may also be applied. Data deduplication scans data blocks and stores only unique data blocks in the datastore. In addition to data deduplication, in some cases, data compression may be used to reduce the size of data blocks by removing redundant data within the data blocks. Accordingly, in some cases, deduplication and compression may be used together to help remove content-level redundancy and increase storage efficiency. Distributed storage systems with data deduplication and compression support, in some cases, may need to carry out various data movement tasks to meet high level objectives such as capacity based load balancing, host or disk decommissioning, etc. However, in a distributed storage system with data deduplication and compression functionalities, moving data blindly from the local storage resources of one host to the local storage resources of another host may negatively affect overall performance of the distributed storage system.

DETAILED DESCRIPTION

Figure 1:
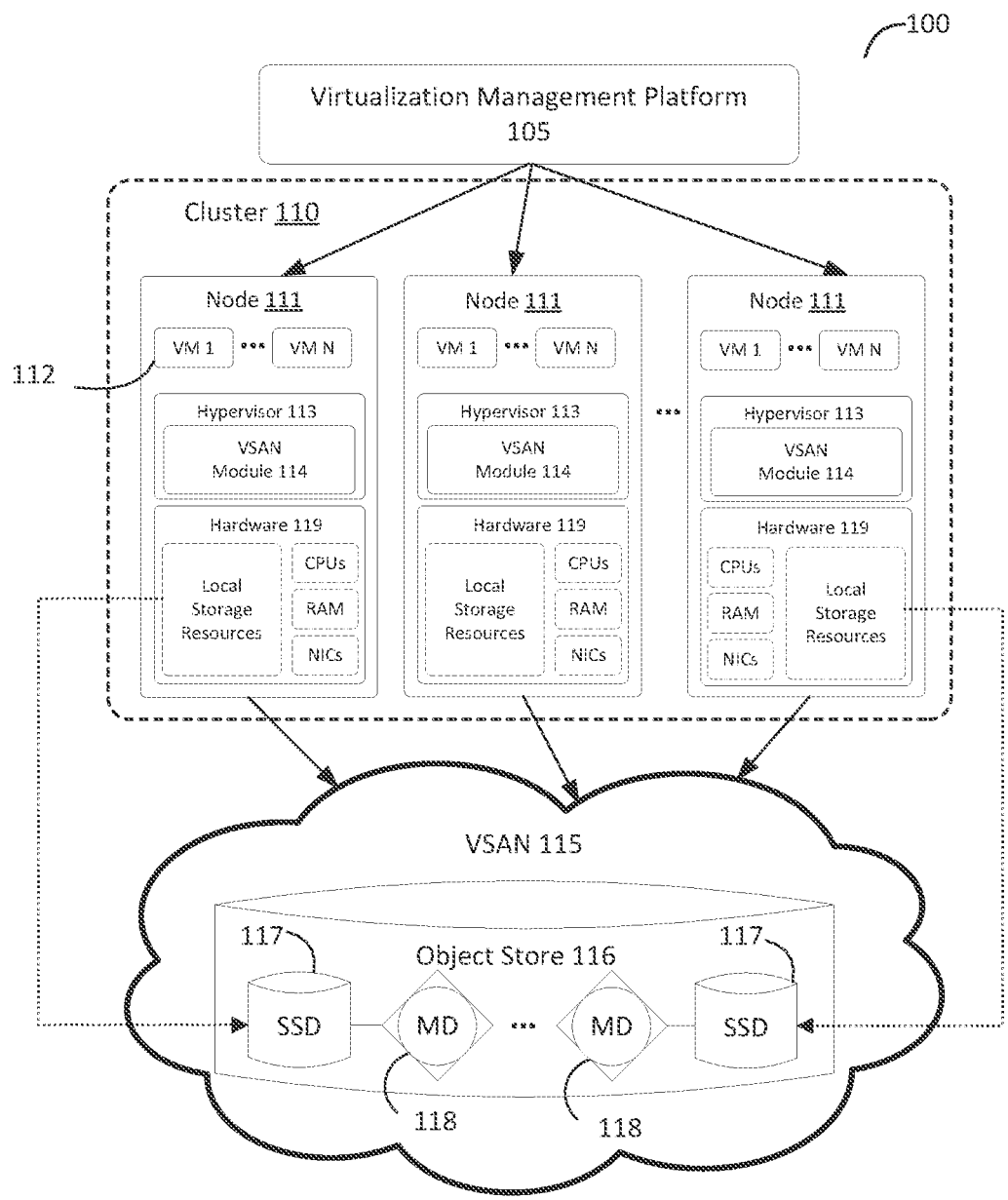
FIG. 1 illustrates an example computing environment in which one or more embodiments may be implemented.

FIG. 1 illustrates an example computing environment in which one or more embodiments may be implemented. As shown, computing environment 100 is a software-based "virtual storage area network" (VSAN) environment that leverages the commodity local storage housed in or directly attached (hereinafter, use of the term "housed" or "housed in" may be used to encompass both housed in or otherwise directly attached) to host servers, which according to embodiments constitute deduplication and compression domains ("D&C domains") or nodes 111 of a cluster 110, to provide an aggregate object store 116 to virtual machines (VMs) 112 running on nodes 111. The local commodity storage housed in or otherwise directly attached to each node 111 may include combinations of solid state drives (SSDs) 117 and/or magnetic or spinning disks 118. In certain embodiments, SSDs 117 serve as a read cache and/or write buffer in front of magnetic disks 118 to increase I/O performance.

In addition, as further discussed below, each node 111 may include a storage management module (referred to herein as a "VSAN module") in order to automate storage management workflows (e.g., create objects in the object store, etc.) and provide access to objects in the object store (e.g., handle I/O operations to objects in the object store, etc.) based on predefined storage policies specified for objects in the object store. For example, because a VM may be initially configured by an administrator to have specific storage requirements for its "virtual disk" depending on its intended use (e.g., capacity, availability, IOPS, etc.), the administrator may define a storage profile or policy for each VM specifying such availability, capacity, IOPS and the like. As further described below, the VSAN module may then create an "object" for the specified virtual disk by backing it with the datastore of the object store based on the defined policy.

A virtualization management platform 105 is associated with cluster 110 of nodes 111. Virtualization management platform 105 enables an administrator to manage the configuration and spawning of VMs on the various nodes 111. As depicted in the embodiment of FIG. 1, each node 111 includes a virtualization layer or hypervisor 113, a VSAN module 114, and hardware 119 (which includes conventional computing hardware, such as one or more central processing units, random access memory, read-only memory, one or more network interface controllers, SSDs 117, and magnetic disks 118). Through hypervisor 113, a node 111 is able to launch and run multiple VMs 112. Hypervisor 113, in part, manages hardware 119 to properly allocate computing resources (e.g., processing power, random access memory, etc.) for each VM 112. Furthermore, as described further below, each hypervisor 113, through its corresponding VSAN module 114, provides access to storage resources located in hardware 119 for use as storage for virtual disks (or portions thereof) and other related files that may be accessed by any VM 112 residing in any of nodes 111 in cluster 110.

In one embodiment, VSAN module 114 is implemented as a "VSAN" device driver within hypervisor 113. VSAN module 114 provides access to a conceptual VSAN 115 through which an administrator can create a number of top-level "device" or namespace objects that are backed by object store 116. In one common scenario, during creation of a device object, the administrator specifies a particular file system for the device object (such device objects hereinafter also thus referred to "file system objects"). For example, each hypervisor 113 in each node 111 may, during a boot process, discover a /vsan/ root node for a conceptual global namespace that is exposed by VSAN module 114. By accessing APIs exposed by VSAN module 114, hypervisor 113 can then determine all the top-level file system objects (or other types of top-level device objects) currently residing in VSAN 115. When a VM (or other client) attempts to access one of the file system objects, hypervisor 113 may dynamically "auto-mount" the file system object at that time. In certain embodiments, file system objects may further be periodically "auto-unmounted" when access to objects in the file system objects cease or are idle for a period of time. A file system object (e.g., /vsan/fs_name1, etc.) that is accessible through VSAN 115 may, for example, be implemented to emulate the semantics of a particular file system such as a virtual machine file system, VMFS, which is designed to provide concurrency control among simultaneously accessing VMs. Because VSAN 115 supports multiple file system objects, it is able provide storage resources through object store 116 without being confined by limitations of any particular clustered file system. For example, many clustered file systems (e.g., VMFS, etc.) can only scale to support a certain amount of nodes 111. By providing multiple top-level file system object support, VSAN 115 overcomes the scalability limitations of such clustered file systems.

As described in further detail in the context of FIG. 2 below, a file system object, may, itself, provide access to a number of virtual disk descriptor files accessible by VMs 112 running in cluster 110. These virtual disk descriptor files contain references to virtual disk "objects" that contain the actual data for the virtual disk and are separately backed by object store 116. A virtual disk object may itself be a hierarchical or "composite" object that, as described further below, is further composed of "component" objects (again separately backed by object store 116) that reflect the storage requirements (e.g., capacity, availability, IOPs, etc.) of a corresponding storage profile or policy generated by the administrator when initially creating the virtual disk. Each VSAN module 114 (through a cluster level object management or "CLOM" sub-module) communicates with other VSAN modules 114 of other nodes 111 to create and maintain an in-memory metadata database (e.g., maintained separately but in synchronized fashion in the memory of each node 111) that contains metadata describing the locations, configurations, policies and relationships among the various objects stored in object store 116. This in-memory metadata database is utilized by a VSAN module 114 on a node 111, for example, when an administrator first creates a virtual disk for a VM as well as when the VM is running and performing I/O operations (e.g., read or write) on the virtual disk. As further discussed below in the context of FIG. 3, VSAN module 114 (through a document object manager or "DOM" sub-module, in some embodiments as further described below) traverses a hierarchy of objects using the metadata in the in-memory database in order to properly route an I/O operation request to the node that houses the actual physical local storage that backs the portion of the virtual disk that is subject to the I/O operation.

Figure 2:
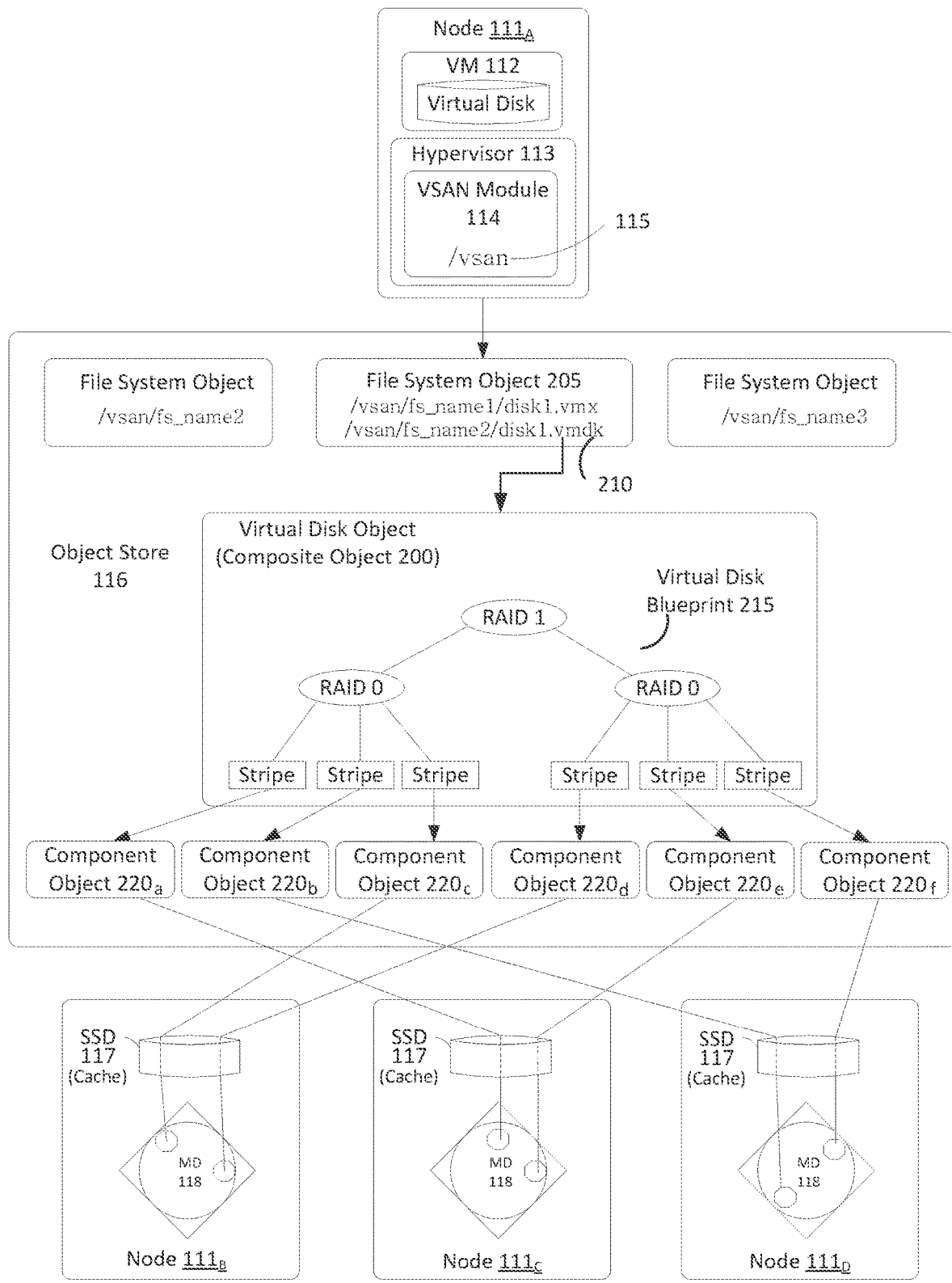
FIG. 2 illustrates an example hierarchical structure of objects organized within an object store that represent a virtual disk.

FIG. 2 illustrates an example hierarchical structure of objects organized within object store 116 that represent a virtual disk. As previously discussed above, a VM 112 running on one of nodes 111 may perform I/O operations on a virtual disk that is stored as a hierarchical or composite object 200 in object store 116. Hypervisor 113 provides VM 112 access to the virtual disk by interfacing with the abstraction of VSAN 115 through VSAN module 114 (e.g., by auto-mounting the top-level file system object corresponding to the virtual disk object, as previously discussed). For example, VSAN module 114, by querying its local copy of the in-memory metadata database, is able to identify a particular file system object 205 (e.g., a VMFS file system object) stored in VSAN 115 that stores a descriptor file 210 for the virtual disk. It should be recognized that the file system object 205 may store a variety of other files consistent with its purpose, such as virtual machine configuration files and the like when supporting a virtualization environment. In certain embodiments, each file system object may be configured to support only those virtual disks corresponding to a particular VM (e.g., a "per-VM" file system object).

Descriptor file 210 includes a reference to composite object 200 that is separately stored in object store 116 and conceptually represents the virtual disk (and thus may also be sometimes referenced herein as a virtual disk object). Composite object 200 stores metadata describing a storage organization or configuration for the virtual disk (sometimes referred to herein as a virtual disk "blueprint") that suits the storage requirements or service level agreements (SLAs) in a corresponding storage profile or policy (e.g., capacity, availability, IOPs, etc.) generated by an administrator when creating the virtual disk. For example, in the embodiment of FIG. 2, composite object 200 includes a virtual disk blueprint 215 that describes a RAID 1 configuration where two mirrored copies of the virtual disk (e.g., mirrors) are each further striped in a RAID 0 configuration. Composite object 200 may thus contain references to a number of "leaf" or "component" objects 220 corresponding to each stripe (e.g., data partition of the virtual disk) in each of the virtual disk mirrors. The metadata accessible by VSAN module 114 in the in-memory metadata database for each component object 220 (e.g., for each stripe) provides a mapping to or otherwise identifies a particular node $111_x$ in cluster 110 that houses the physical storage resources (e.g., SDD 117, magnetic disks 118, etc.) that actually store the stripe (as well as the location of the stripe within such physical resource).

Figure 3:
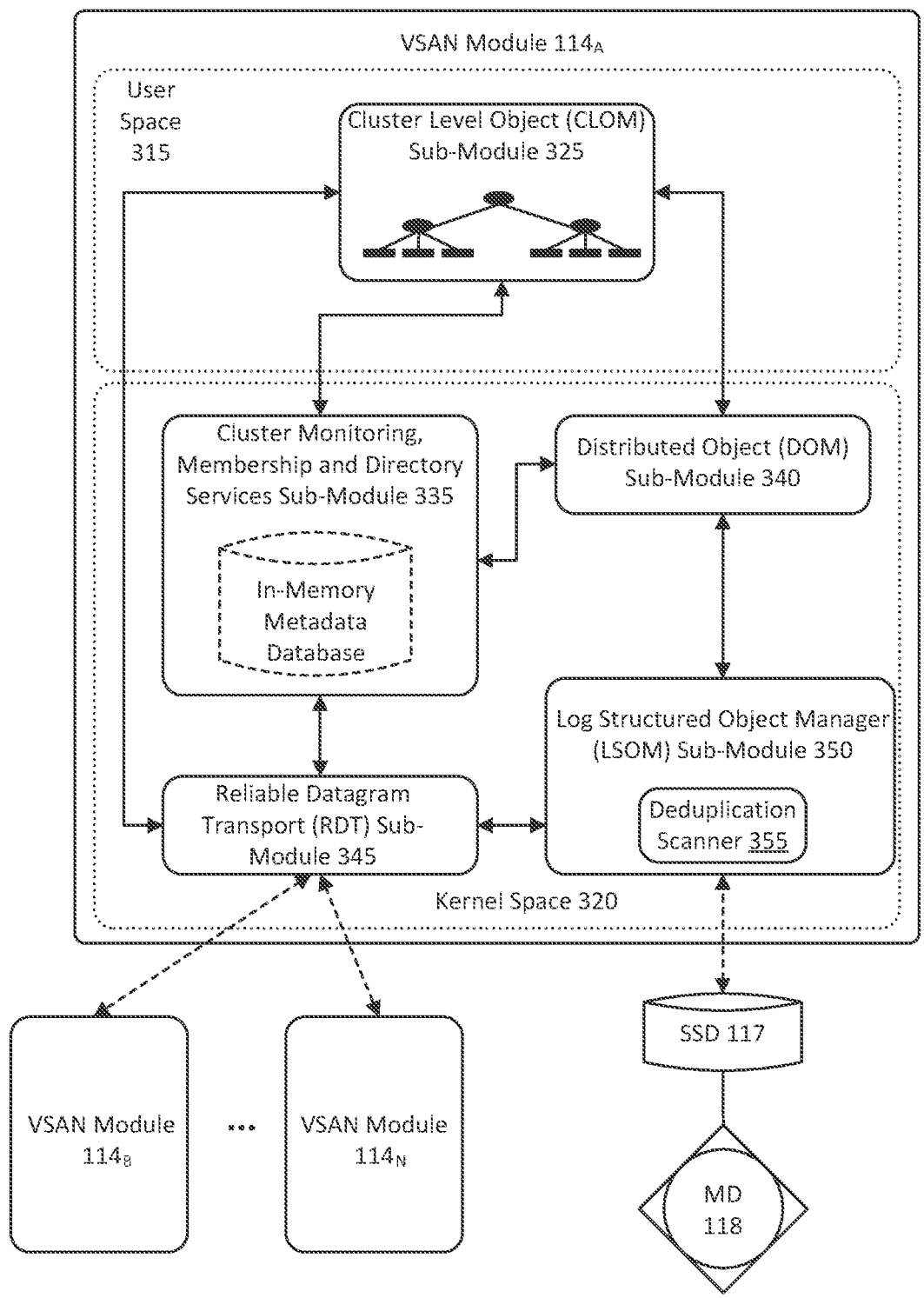
FIG. 3 illustrates components of a virtual storage area network module implemented in the computing environment of FIG. 1.

FIG. 3 illustrates components of VSAN module 114. As previously described, in certain embodiments, VSAN module 114 may execute as a device driver exposing an abstraction of a VSAN 115 to hypervisor 113. Various sub-modules of VSAN module 114 handle different responsibilities and may operate within either user space 315 or kernel space 320 depending on such responsibilities. As depicted in the embodiment of FIG. 3, VSAN module 114 includes a cluster level object management (CLOM) sub-module 325 that operates in user space 315. CLOM sub-module 325 generates virtual disk blueprints during creation of a virtual disk by an administrator and ensures that objects created for such virtual disk blueprints are configured to meet storage profile or policy requirements set by the administrator. In addition to being accessed during object creation (e.g., for virtual disks), CLOM sub-module 325 may also be accessed (e.g., to dynamically revise or otherwise update a virtual disk blueprint or the mappings of the virtual disk blueprint to actual physical storage in object store 116) on a change made by an administrator to the storage profile or policy relating to an object or when changes to the cluster or workload result in an object being out of compliance with a current storage profile or policy.

In some embodiments, if an administrator creates a storage profile or policy for a composite object such as virtual disk object 200, CLOM sub-module 325 applies a variety of heuristics and/or distributed algorithms to generate virtual disk blueprint 215 that describes a configuration in cluster 110 that meets or otherwise suits the storage policy (e.g., RAID configuration to achieve desired redundancy through mirroring and access performance through striping, which nodes' local storage should store certain portions/partitions/stripes of the virtual disk to achieve load balancing, etc.). For example, CLOM sub-module 325, in some embodiments, is responsible for generating blueprint 215 describing the RAID 1/RAID 0 configuration for virtual disk object 200 in FIG. 2 when the virtual disk was first created by the administrator. As previously discussed, a storage policy may specify requirements for capacity, IOPS, availability, and reliability. Storage policies may also specify a workload characterization (e.g., random or sequential access, I/O request size, cache size, expected cache hit ration, etc.). Additionally, the administrator may also specify an affinity to VSAN module 114 to preferentially use certain nodes 111 (or the local disks housed therein). For example, when provisioning a new virtual disk for a VM, an administrator may generate a storage policy or profile for the virtual disk specifying that the virtual disk have a reserve capacity of 400 GB, a reservation of 150 read IOPS, a reservation of 300 write IOPS, and a desired availability of 99.99%. Upon receipt of the generated storage policy, CLOM sub-module 325 consults the in-memory metadata database maintained by its VSAN module 114 to determine the current state of cluster 110 in order generate a virtual disk blueprint for a composite object (e.g., the virtual disk object) that suits the generated storage policy. As further discussed below, CLOM sub-module 325 may then communicate the blueprint to its corresponding distributed object manager (DOM) sub-module 340 which interacts with object space 116 to implement the blueprint by, for example, allocating or otherwise mapping component objects (e.g., stripes) of the composite object, and more particularly, data blocks of component objects, to physical storage locations within various nodes 111 of cluster 110.

In addition to CLOM sub-module 325 and DOM sub-module 340, as further depicted in FIG. 3, VSAN module 114 may also include a cluster monitoring, membership, and directory services (CMMDS) sub-module 335 that maintains the previously discussed in-memory metadata database to provide information on the state of cluster 110 to other sub-modules of VSAN module 114 and also tracks the general "health" of cluster 110 by monitoring the status, accessibility, and visibility of each node 111 in cluster 110. The in-memory metadata database serves as a directory service that maintains a physical inventory of the VSAN environment, such as the various nodes 111, the storage resources in the nodes 111 (SSD, magnetic disks, etc.) housed therein and the characteristics/capabilities thereof, the current state of the nodes 111 and their corresponding storage resources, network paths among the nodes 111, and the like. As previously discussed, in addition to maintaining a physical inventory, the in-memory metadata database further provides a catalog of metadata for objects stored in object store 116 (e.g., what composite and component objects exist, what component objects belong to what composite objects, which nodes serve as "coordinators" or "owners" that control access to which objects, quality of service requirements for each object, object configurations, the mapping of objects to physical storage locations, etc.). As previously discussed, other sub-modules within VSAN module 114 may access CMMDS sub-module 335 (represented by the connecting lines in FIG. 3) for updates to learn of changes in cluster topology and object configurations. For example, as previously discussed, during virtual disk creation, CLOM sub-module 325 accesses the in-memory metadata database to generate a virtual disk blueprint, and in order to handle an I/O operation from a running VM 112, DOM sub-module 340 accesses the in-memory metadata database to determine the nodes 111 that store the component objects (e.g., stripes) of a corresponding composite object (e.g., virtual disk object) and the paths by which those nodes are reachable in order to satisfy the I/O operation.

As previously discussed, DOM sub-module 340, during the handling of I/O operations as well as during object creation, controls access to and handles operations on those component objects in object store 116 that are stored in the local storage of the particular node 111 in which DOM sub-module 340 runs as well as certain other composite objects for which its node 111 has been currently designated as the "coordinator" or "owner." For example, when handling an I/O operation from a VM, due to the hierarchical nature of composite objects in certain embodiments, a DOM sub-module 340 that serves as the coordinator for the target composite object (e.g., the virtual disk object that is subject to the I/O operation) may need to further communicate across the network with a different DOM sub-module 340 in a second node that serves as the coordinator for the particular component object (e.g., stripe, etc.) of the virtual disk object that is stored in the local storage of the second node 111 and which is the portion of the virtual disk that is subject to the I/O operation. If the VM issuing the I/O operation resides on a node 111 that is also different from the coordinator of the virtual disk object, the DOM sub-module 340 of node 111 running the VM would also have to communicate across the network with the DOM sub-module 340 of the coordinator. In certain embodiments, if the VM issuing the I/O operation resides on a node that is different from the coordinator of the virtual disk object subject to the I/O operation, the two DOM sub-modules 340 of the two nodes may need to communicate to change the role of the coordinator of the virtual disk object to the node running the VM (e.g., thereby reducing the amount of network communication needed to coordinate I/O operations between the node running the VM and the node serving as the coordinator for the virtual disk object).

DOM sub-modules 340 also similarly communicate amongst one another during object creation. For example, a virtual disk blueprint generated by CLOM module 325 during creation of a virtual disk may include information that designates which node 111 should serve as the coordinators for the virtual disk object as well as its corresponding component objects (stripes, etc.). Each of the DOM sub-modules 340 for such designated nodes is issued requests (e.g., by the DOM sub-module 340 designated as the coordinator for the virtual disk object or by the DOM sub-module 340 of the node generating the virtual disk blueprint, etc. depending on embodiments) to create their respective objects, allocate local storage to such objects (if needed), and advertise their objects to their corresponding CMMDS sub-module 335 in order to update the in-memory metadata database with metadata regarding the object. In order to perform such requests, DOM sub-module 340 interacts with a log structured object manager (LSOM) sub-module 350 that serves as the component in VSAN module 114 that actually drives communication with the local SSDs and magnetic disks of its node 111. In addition to allocating local storage for component objects (as well as to store other metadata such a policies and configurations for composite objects for which its node serves as coordinator, etc.), LSOM sub-module 350 additionally monitors the flow of I/O operations to the local storage of its node 111, for example, to report whether a storage resource is congested.

FIG. 3 also depicts a reliable datagram transport (RDT) sub-module 345 that delivers datagrams of arbitrary size between logical endpoints (e.g., nodes, objects, etc.), where the endpoints may potentially be over multiple paths. In some embodiments, the underlying transport is TCP. Alternatively, other transports such as RDMA may be used. RDT sub-module 345 is used, for example, when DOM sub-modules 340 communicate with one another, as previously discussed above to create objects or to handle I/O operations. In certain embodiments, RDT module 345 interacts with CMMDS module 335 to resolve the address of logical endpoints dynamically in order to maintain up-to-date location information in the in-memory metadata database as well as to create, remove, or reestablish connections based on link health status. For example, if CMMDS module 335 reports a link as unhealthy, RDT sub-module 345 may drop the connection in favor of a link in better condition.

According to embodiments described herein, LSOM sub-module 350 carries out deduplication and compression prior to storing a data block in the local storage of its node 111. For deduplication, LSOM sub-module 350 retrieves a global hash table (e.g., global hash table 450 in FIG. 4) stored in the local storage of its node 111. The global hash table contains a hash of every data block that is stored in the local storage of its node 111. Each row of the global hash table contains the following information: the hash value of the data block, a reference count indicating how many times this data block is referenced in the metadata of all component objects 220, a physical location in the local storage where the data block is stored, and the length or size of the data block before compression and after compression. Before a new data block is stored in the local storage of its node 111, LSOM sub-module 350 hashes the new data block (using the same hash algorithm that was used when generating the hashes in the global hash table) and compares it to the existing values in the global hash table. If a match is found, this signifies that the new data block is identical to another data block which is already stored in the local storage. As a result, LSOM sub-module 350 does not store the new data block in the local storage of its node 111. Instead, LSOM sub-module 350 sets the pointer for the new data block to reference the physical location of this other data block. On the other hand, if a match is not found, LSOM sub-module 350 stores the new data block in a new physical location and sets the pointer for the new data block to the new physical location.

Figure 4:
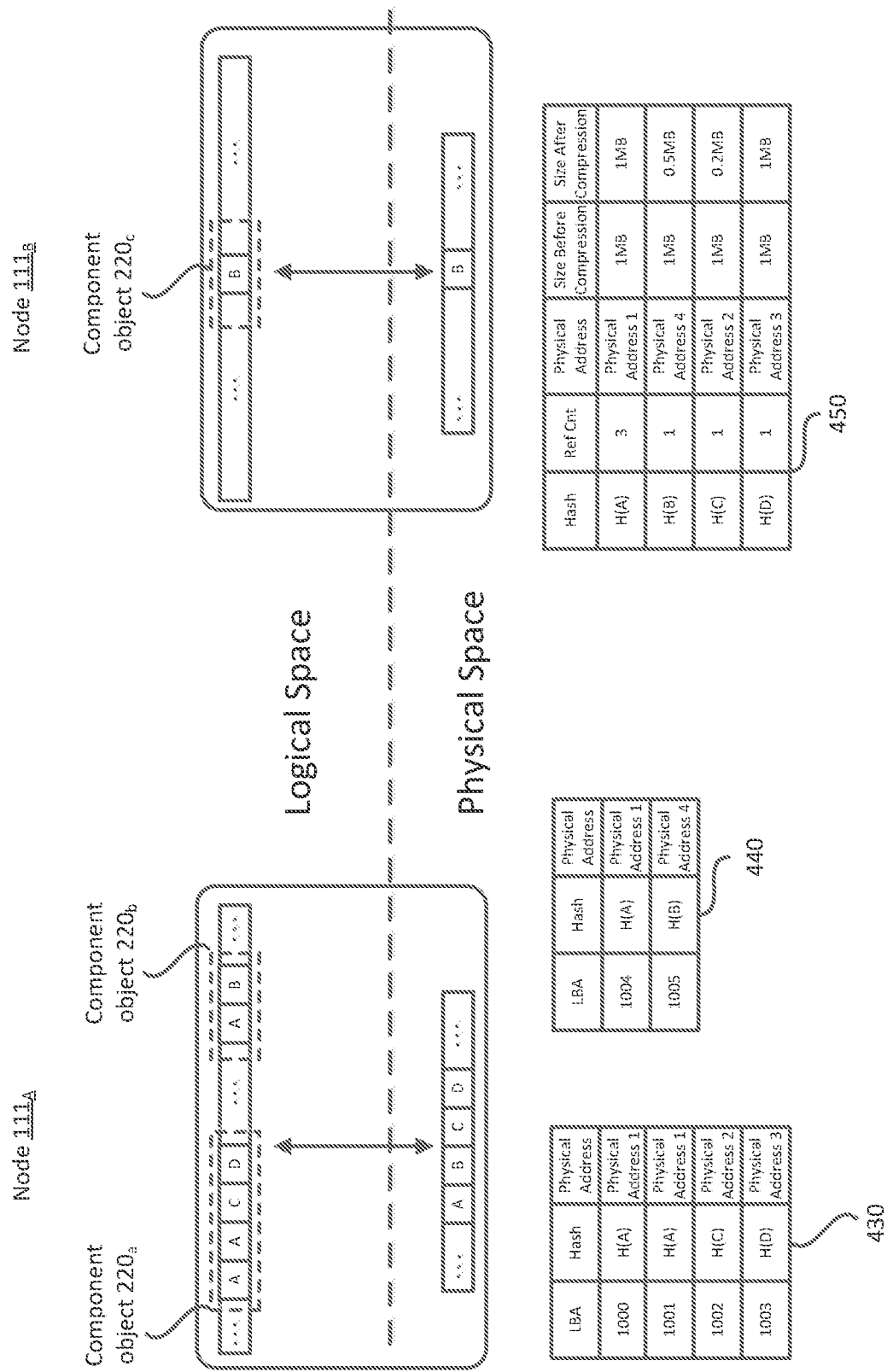
FIG. 4 is a conceptual diagram illustrating logical and physical storage spaces of two nodes between which a component object is proposed to be migrated.

FIG. 4 shows a conceptual diagram illustrating logical and physical storage spaces of two nodes 111a and 111b. FIG. 4 illustrates the local storage of node 111a storing component objects 220a and 220b, and the local storage of node 111b storing component object 220c. Component object 220a comprises four data blocks A, A, C, and D, while component object 220b comprises two data blocks A and B. As described herein, duplicate data blocks are given the same labels. Accordingly, data block A is a duplicate data block, whereas data blocks B, C, and D are not. With deduplication, because data block A is duplicated across three data blocks, only a single copy thereof is stored in the physical storage space. Therefore, FIG. 4 shows only data blocks A, B, C, and D as being physically stored.

For compression, LSOM sub-module 350 may employ any known compression technique to compress a new data block prior to storing the contents in the local storage of its node 111. In the embodiments described herein, a compression ratio of at least 2 is assumed. If compression ratio of at least 2 cannot be achieved, LSOM sub-module 350 does not perform the compression. As described above, global hash table 450 indicates the size of each data block before and after compression. Assuming the original size of each data block is, for example 1 MB, hash table 450 shows data blocks A and D still having the same size of 1 MB after compression. This is an example of when a compression ratio of at least 2 was not possible and, therefore, data blocks A and D were not compressed. In contrast, data blocks B and C were compressed and, in the example, have block sizes of 0.5 MB and 0.2 MB, respectively.

As described above, moving a component object from the local storage of one node 111 to another without having estimated the amount of storage space that may be offloaded at the source node 111 and the amount of storage space that may be occupied at the destination source node 111, sometimes results in negatively impacting the overall capacity utilization of the storage resources in cluster 110. Accordingly, LSOM sub-module 350 includes a deduplication ("dedup") scanner 355, which accesses the metadata of each component object 220 that is backed by the local storage of its node 111, at periodic intervals, to determine various metrics about each component object. These metrics include, for example, the total number of bytes used by all data blocks before deduplication and compression, the total number of bytes used by unique data blocks after compression, and the total number of bytes used by distinct data blocks after compression, for each component object. The metadata of each component object 220 includes a hash table (e.g., hash tables 430 and 440, described below) corresponding to each component object 220 and its data blocks. Dedup scanner 355 accesses these hash tables in addition to the global hash table (e.g., global hash table 450) when determining the metrics.

Examples of hash tables created by LSOM sub-module 350 are shown in FIG. 4. The hash table for component object 220a is shown as hash table 430. Each row of hash table 430 contains the following information: the logical block address (LBA) of the data block, the hash value of the data block, and a physical location in the local storage where the data block is stored. For example, the first row of hash table 430 illustrates the LBA of the first data block A (e.g., LBA 1000), the hash of data block A (represented as H(A)), and the physical address of where data block A is stored (represented as physical address 1). FIG. 4 also illustrates hash table 440 for component object 220b.

As described above, when determining the metrics above, dedup scanner 355 also accesses the global hash table for all data blocks in all component objects 220 of a particular node (e.g., node 111a). Global hash table 450 is an example of a global hash table corresponding to component objects 220a and 220b. As depicted, global hash table 450 shows four hash values (H(A), H(B), H(C), and H(D)), each having a reference count, a physical address, and a block size before and after compression. For quick access, global hash table 450 is also stored in the in-memory metadata database of node 111*a*.

Figure 5:
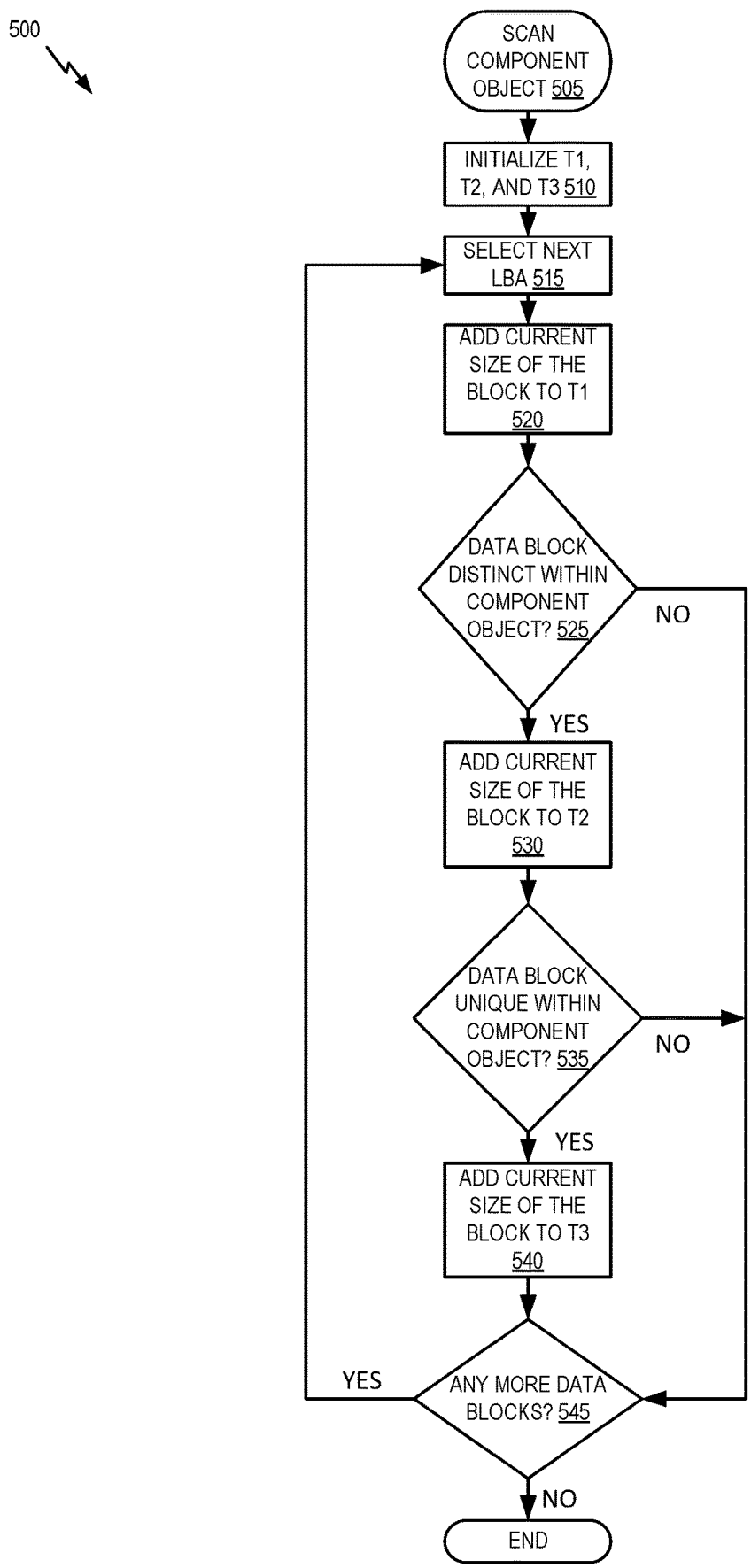
FIG. 5 illustrates example operations carried out by a deduplication scanner to determine a set of metrics about each component object in a node.

FIG. 5 illustrates example operations carried out by dedup scanner 355 to determine the total number of bytes used by all data blocks before deduplication and compression, the total number of bytes used by unique blocks after compression, and the total number of bytes used by distinct blocks after compression, in each component object 220.

At 505, dedup scanner 355 examines the first component object (e.g., component object 220*a*) from a plurality of component objects (e.g., component object 220*a* and 220*b*) in a node (e.g., node 111*a*). More specifically, dedup scanner 355 accesses the metadata of component object 220, in particular the hash table for the component object 220, and the global hash table stored in the local storage of its node 111.

At 510, dedup scanner 355 initializes three parameters T1, T2, and T3. T1 represents the running total of the number of bytes used by all data blocks before deduplication and compression. T2 represents the running total of the number of bytes used by all distinct blocks after compression and T3 represents the running total of the number of bytes used by all unique blocks after compression.

At 515, dedup scanner 355 examines the hash table for the component object 220 and selects the next LBA in the component object 220. For example, when scanning component object 220*a*, dedup scanner 355 examines hash table 430 and selects the first LBA (e.g., LBA 1000). In addition, dedup scanner 355 retrieves the hash value corresponding to the selected LBA from the hash table for the component object 220. This hash value is used to perform lookups of global hash table 450 as described below.

At 520, dedup scanner 355 determines and adds the size of the data block before compression, corresponding to the LBA selected at step 515, to T1. In order to determine the size of the data block before compression, dedup scanner 355 performs a lookup of global hash table 450 using the hash value of the selected LBA and retrieves the size of the data block before compression from an entry of global hash table 450 corresponding to the selected LBA.

At 525, dedup scanner 355 determines if the LBA selected at step 515 corresponds to a distinct data block in the corresponding component object 220. Dedup scanner 355 performs this step by examining the hash value corresponding to the selected LBA. If this hash value has been encountered for the first time, dedup scanner 355 determines the data block corresponding to the selected LBA to be a distinct data block and the operation proceeds to 530. On the other hand, if this hash value has been encountered before, dedup scanner 355 determines the data block corresponding to the selected LBA to be a non-distinct data block and the operation skips to 545.

At 530, dedup scanner 355 performs a lookup of global hash table 450 using the hash value of the selected LBA, retrieves the size of the corresponding data block after compression from an entry of global hash table 450 corresponding to the selected LBA, and adds it to T2. After 530, dedup scanner executes 535, at which dedup scanner 355 determines if the data block corresponding to the selected LBA is unique, i.e., stored only once in the local storage resources of the node for component object 220. To determine if the data block corresponding to the selected LBA is unique, dedup scanner 355 retrieves a reference count from an entry of global hash table 450 corresponding to the selected LBA. A reference count of 1 indicates that the data block is unique. On the other hand, a reference count of greater than 1 indicates that the data block is shared and thus not unique.

If, at 535, dedup scanner 355 determines that the data block corresponding to the selected LBA is unique, the operation proceeds to 540. On the other hand, if dedup scanner 355 determines that the data block corresponding to the selected LBA is not unique, the operation skips to 545.

At 540, dedup scanner 355 adds the size of the corresponding data block after compression (as retrieved at 530) to T3. After 540, dedup scanner executes 545, at which dedup scanner 355 determines if there are any more data blocks in component object 220. If there is one more, the operation returns to 515 at which dedup scanner 355 examines the hash table for the component object 220 and selects the next LBA in the component object 220. If there is no more, the operation ends.

After completing the scanning of all LBAs of a component object 220, dedup scanner 355 moves to the next component object 220 until all component objects 220 of a node 111 are scanned.

Referring back to FIG. 4, FIG. 4 illustrates two nodes 111*a* and 111*b*, between which a component object 220 is proposed to be migrated. In one embodiment, the migration between nodes 111*a* and 111*b* is recommended by CLOM sub-module 325 as a result of CLOM sub-module 325 performing load balancing. For example, upon determining that the local storage of a source node (e.g., node 111*a*) is over-utilized, CLOM sub-module 325 performs a selection of a component object 220 to be moved from the source node (e.g., node 111*a*) if there are multiple candidates. This selection is made using the T3 metric of a component object, which is the total number of bytes occupied by unique data blocks of the component object 220 after compression.

The total number of bytes occupied by unique data blocks of the component object 220 after compression provides an estimation about the amount of space to be freed at a source node (e.g., node 111*a*) upon migration of the component object, but it does not provide an estimation about the amount of storage the component object 220 may occupy on the local storage of a destination node (e.g., node 111*b*). Because the source node does not have information about what data blocks are stored at the destination node, it is advantageous for the source node to estimate the amount of storage that may be occupied by the component object 220 upon migration to the destination node. In one embodiment, this estimation is provided by the T2 metric, which represents the total number of bytes occupied by the distinct data blocks in a component object 220 after compression.

Figure 6:
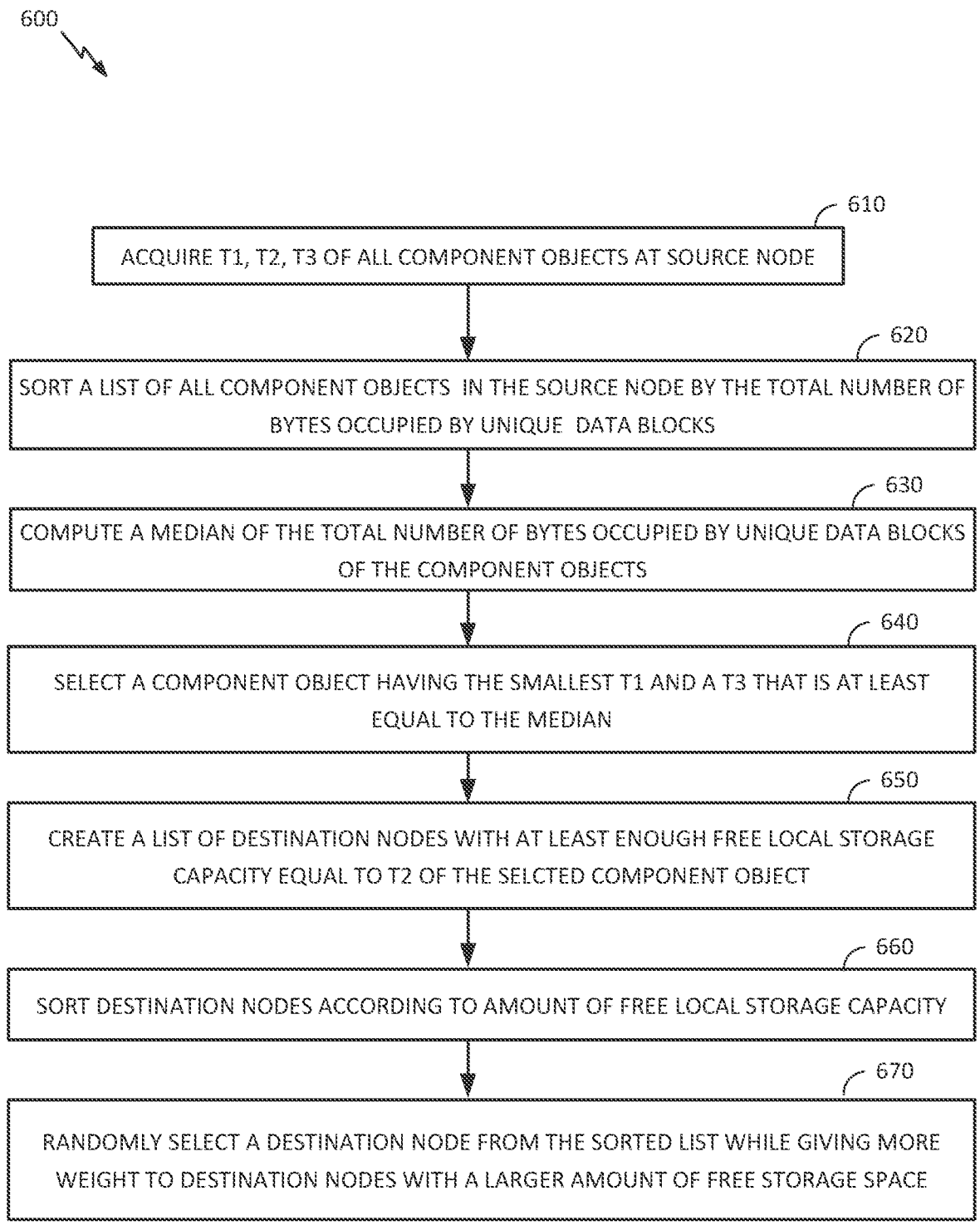
FIG. 6 is an example flow diagram that illustrates steps carried out by a virtual SAN sub-module of a source node to select a component object for migration from a source node and also select a destination node to house the component object.

FIG. 6 is an example flow diagram that illustrates steps carried out by a virtual SAN sub-module, e.g., CLOM sub-module 325, of a source node to select a component object for migration from a source node and also select a destination node to house the component object 220.

At 610, CLOM sub-module 325 acquires T1, T2, and T3 metrics for all component objects in the source node (e.g., node 111*a*) from dedup scanner 355. At 620, CLOM sub-module 325 sorts a list of all component objects 220 in the source node by the total number of bytes occupied by unique data blocks (T3) of the respective component objects after compression.

At 630, CLOM sub-module 325 computes the median of the total number of bytes occupied by unique data blocks of the respective component objects after compression. In the embodiment illustrated herein, this median is used as the target number of bytes for migration. At 640, CLOM sub-module 325 selects a component object having the smallest T1 and a T3 that is at least equal to the median computed above.

At 650, CLOM sub-module 325 creates a list of destination nodes having sufficient free local storage capacity to accommodate the component object selected at 630, i.e., free local storage capacity that is greater than or equal to T2 of the component object selected at 630. In one embodiment, CLOM sub-module 325 retrieves information about the amount of free local storage capacity space at each candidate destination node from in-memory metadata database maintained by CMMDS sub-module 335.

At 660, CLOM sub-module 325 sorts the destination nodes according to the amount of free local storage capacity thereat. At 670, CLOM sub-module 325 randomly selects a destination node from the sorted list while giving more weight to nodes with a larger amount of free local storage capacity.

After CLOM sub-module 325 selects both the component object for migration as well as the destination node, CLOM sub-module 325 of the source node communicates with CLOM sub-module 325 of the destination node to carry out the component object migration using known techniques. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

In addition, while described virtualization methods have generally assumed that virtual machines present interfaces consistent with a particular hardware system, the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of one or more embodiments. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s). In the claims, elements and/or steps do not imply any particular order of operation, unless explicitly stated in the claims.

We claim:

1. A method for migrating a first group of data blocks stored in a first node to a second node, comprising:

determining, for each of a plurality of groups of data blocks stored in the first node, a corresponding first metric representing a total size for storing all data blocks in the corresponding group without deduplication, wherein each data block of the plurality of groups of data blocks is associated with a corresponding physical address;

determining, for each of the plurality of groups of data blocks stored in the first node, a corresponding second metric representing a total size for storing all unique data blocks in the corresponding group, wherein a given data block is a unique data block if no other data block of the plurality of groups of data blocks is associated with the same physical address as the given data block;

selecting the first group of data blocks for migration from the first node to the second node based on the corresponding first metric satisfying a first criteria and the corresponding second metric satisfying a second criteria; and migrating the first group of data blocks to the second node.

2. The method of claim 1, wherein the second criteria is that the corresponding second metric is equal to or greater than a median of all second metrics of the plurality of groups of data blocks.

3. The method of claim 1, wherein the first criteria is that the corresponding first metric has a minimum value among all first metrics of all of the plurality of groups of data blocks associated with a second metric that satisfies the second criteria.

4. The method of claim 1, further comprising:
determining, for each of the plurality of groups of data blocks stored in the first node, a corresponding third metric representing a total size for storing all distinct data blocks in the corresponding group, wherein the total size for storing all distinct data blocks in the corresponding group comprises a total size for storing all data blocks in the corresponding group with deduplication across the corresponding group; and
selecting the second node from among a plurality of nodes based on the second node having available storage capacity equal to or greater than the third metric of the first group of data blocks.

5. The method of claim 4, wherein multiple nodes of the plurality of nodes have available storage capacity equal to or greater than the third metric of the first group of data blocks, and wherein the second node is randomly selected from among the multiple of the plurality of nodes.

6. The method of claim 1, wherein the first metric is determined based on uncompressed sizes of data blocks, and wherein the second metric is determined based on compressed sizes of data blocks.

7. The method of claim 1, wherein each of the plurality of groups of data blocks is a component object of a composite object.

8. A non-transitory computer readable storage medium comprising instructions that are executable in a computer system to cause the computer system to perform a method for migrating a first group of data blocks stored in a first node to a second node, comprising:
determining, for each of a plurality of groups of data blocks stored in the first node, a corresponding first metric representing a total size for storing all data blocks in the corresponding group without deduplication, wherein each data block of the plurality of groups of data blocks is associated with a corresponding physical address;
determining, for each of the plurality of groups of data blocks stored in the first node, a corresponding second metric representing a total size for storing all unique data blocks in the corresponding group, wherein a given data block is a unique data block if no other data block of the plurality of groups of data blocks is associated with the same physical address as the given data block;
selecting the first group of data blocks for migration from the first node to the second node based on the corresponding first metric satisfying a first criteria and the corresponding second metric satisfying a second criteria; and
migrating the first group of data blocks to the second node.

9. The non-transitory computer readable storage medium of claim 8, wherein the second criteria is that the corresponding second metric is equal to or greater than a median of all second metrics of the plurality of groups of data blocks.

10. The non-transitory computer readable storage medium of claim 8, wherein the first criteria is that the corresponding first metric has a minimum value among all first metrics of all of the plurality of groups of data blocks associated with a second metric that satisfies the second criteria.

11. The non-transitory computer readable storage medium of claim 8, wherein the method further comprises:
determining, for each of the plurality of groups of data blocks stored in the first node, a corresponding third metric representing a total size for storing all distinct data blocks in the corresponding group, wherein the total size for storing all distinct data blocks in the corresponding group comprises a total size for storing all data blocks in the corresponding group with deduplication across the corresponding group; and
selecting the second node from among a plurality of nodes based on the second node having available storage capacity equal to or greater than the third metric of the first group of data blocks.

12. The non-transitory computer readable storage medium of claim 11, wherein multiple nodes of the plurality of nodes have available storage capacity equal to or greater than the third metric of the first group of data blocks, and wherein the second node is randomly selected from among the multiple of the plurality of nodes.

13. The non-transitory computer readable storage medium of claim 8, wherein the first metric is determined based on uncompressed sizes of data blocks, and wherein the second metric is determined based on compressed sizes of data blocks.

14. The non-transitory computer readable storage medium of claim 8, wherein each of the plurality of groups of data blocks is a component object of a composite object.

15. A computer system comprising:
local storage of a first node that stores a plurality of groups of data blocks; and
a processor configured to:
determine, for each of the plurality of groups of data blocks stored in the first node, a corresponding first metric representing a total size for storing all data blocks in the corresponding group without deduplication, wherein each data block of the plurality of groups of data blocks is associated with a corresponding physical address;
determine, for each of the plurality of groups of data blocks stored in the first node, a corresponding second metric representing a total size for storing all unique data blocks in the corresponding group, wherein a given data block is a unique data block if no other data block of the plurality of groups of data blocks is associated with the same physical address as the given data block;
select the first group of data blocks for migration from the first node to the second node based on the corresponding first metric satisfying a first criteria and the corresponding second metric satisfying a second criteria; and
migrate the first group of data blocks to the second node.

16. The computer system of claim 15, wherein the second criteria is that the corresponding second metric is equal to or greater than a median of all second metrics of the plurality of groups of data blocks.

17. The computer system of claim 15, wherein the first criteria is that the corresponding first metric has a minimum value among all first metrics of all of the plurality of groups of data blocks associated with a second metric that satisfies the second criteria.

18. The computer system of claim 15, wherein the processor is further configured to:
determine, for each of the plurality of groups of data blocks stored in the first node, a corresponding third metric representing a total size for storing all distinct data blocks in the corresponding group, wherein the total size for storing all distinct data blocks in the corresponding group comprises a total size for storing all data blocks in the corresponding group with deduplication across the corresponding group; and select the second node from among a plurality of nodes based on the second node having available storage capacity equal to or greater than the third metric of the first group of data blocks.

19. The computer system of claim 18, wherein multiple nodes of the plurality of nodes have available storage capacity equal to or greater than the third metric of the first group of data blocks, and wherein the second node is randomly selected from among the multiple of the plurality of nodes.

20. The computer system of claim 15, wherein the first metric is determined based on uncompressed sizes of data blocks, and wherein the second metric is determined based on compressed sizes of data blocks.

* * * * *